United States Patent [19]

Weinblatt

[11] Patent Number: 4,659,314
[45] Date of Patent: Apr. 21, 1987

[54] SURVEY TECHNIQUE FOR READERSHIP OF PUBLICATIONS

[76] Inventor: Lee S. Weinblatt, 797 Winthrop Rd., Teaneck, N.J. 07666

[21] Appl. No.: 827,757

[22] Filed: Feb. 7, 1986

[51] Int. Cl.⁴ .................................................. G09B 5/00
[52] U.S. Cl. ..................................... 434/236; 340/568; 340/572; 340/573
[58] Field of Search ................. 434/236; 340/572, 573, 340/568

[56] References Cited

U.S. PATENT DOCUMENTS 3,534,358 10/1970 Stern .
3,618,059 11/1971 Allen ..................................... 340/572
3,891,980 6/1975 Lewis et al. .
4,112,926 9/1978 Schulman et al. .
4,157,540 6/1979 Oros ..................................... 340/573

Primary Examiner—Leo P. Picard
Attorney, Agent, or Firm—Thomas Langer

[57] ABSTRACT

A technique is provided for providing accurate information regarding the readership of certain magazines. A transmitter unit is attached to the magazines of interest and emits a signal unique to that particular magazine. A receiver unit is worn by individuals who have been selected as test subjects. The transmitter unit can detect the emitted signal only when it is within approximately one foot from the magazine. The receiver unit includes circuitry responsive only to the particular signal emitted by the transmitter in the magazine. When that signal is received, information is stored in memory regarding the occurrence of exposure of the magazine to the individual test subject and/or the time period of exposure. Information stored in that memory is then retrieved for analysis.

18 Claims, 1 Drawing Figure

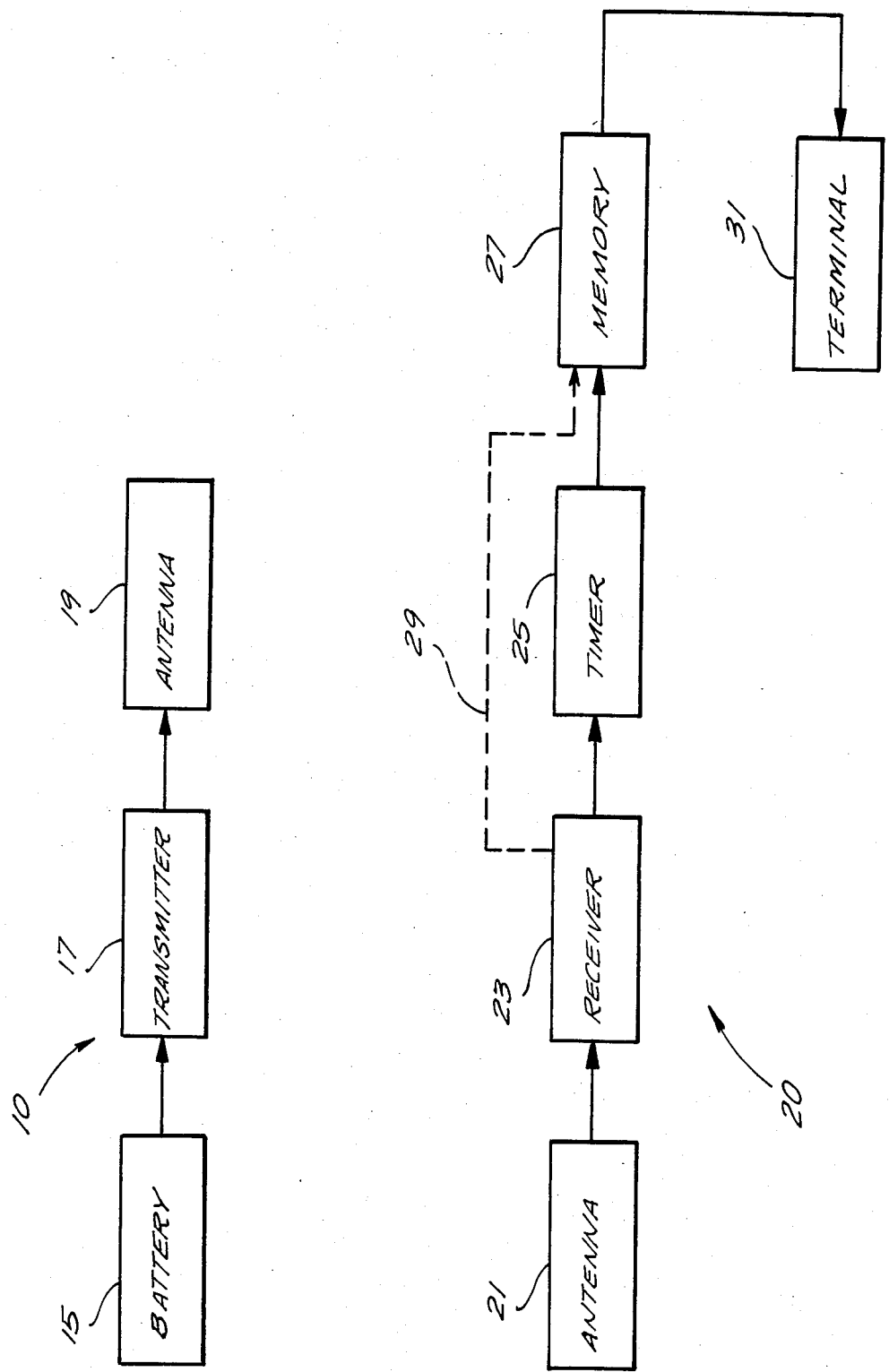

4,659,314

SURVEY TECHNIQUE FOR READERSHIP OF PUBLICATIONS

BACKGROUND OF THE INVENTION

This invention is related to a technique for monitoring the exposure of selected publications to readers and, more particularly, to an accurate, reliable electronic technique for determining when an individual who has been selected as a test subject is positioned close enough to the publication so that he is likely to be reading it.

Various techniques are now in use to determine the readership of selected publications. Such publications are typically magazines. The term "magazine" will be used hereinafter to include any type of publication. Publishers and advertisers require this information in order to determine readership which, in turn, is useful to set printing runs, establish advertising rates, indicate geographic areas for concentrating resources, and provide an analysis of economic and social categories of the readership, and the like.

To currently obtain this information, such surveys are conducted primarily in one of two ways. Firstly, individuals are contacted personally or by phone and interviewed as to their magazine preferences. However, this method is inaccurate because it relies on memory recall of the individuals which has been shown as suspect and insufficiently accurate. Moreover, once the interviewer reveals the magazine in which he is interested, the selected individual being interviewed may develop a subjective inclination in favor of that magazine which may not in fact be true.

The second approach involves collecting a number of volunteer or paid individuals who are expected to keep a diary of their reading habits. The diaries are then retrieved periodically from the individuals, and analyzed. However, this approach relies exclusively on the accurate and complete record keeping of the particular individuals involved. Unfortunately, this also tends to be unreliable because people occasionally forget to make entries, they may be distracted from doing it, or, occasionally, may simply not be inclined to make an entry. Therefore, the techniques conventionally used up to the present time suffer from serious disadvantages which have caused concern about the accuracy, and therefore the underlying value, of such surveys.

SUMMARY OF THE INVENTION

It is a primary object of the present invention to provide a technique for surveying magazine readership which provides improved accuracy.

Another object of the present invention is to provide a technique for surveying the readership of magazines without relying on the memory of the selected test subjects.

A further object of the present invention is to provide a technique for surveying the readership of selected magazines without predisposing the individual test subjects to a particular magazine.

Yet another object of the present invention is to provide a technique for surveying the readership of magazines electronically and without the need to conduct interviews or keep diaries.

Still another object of the present invention is to provide a technique for surveying the readership of magazines without the selected individuals being aware that a test involving magazines is in progress.

These and other objects of the present invention are accomplished by a system for surveying the readership of a designated magazine by individuals selected as test subjects, comprising a transmitter unit adapted to be attached to a copy of said designated magazine and including a power source, and a transmitter means connected to said power source for emitting an identification signal which is unique to said designated magazine; and a receiver unit adapted to be worn by each of said selected individuals and including detecting means for responding to said identification signal to generate a control signal, memory means for storing a signal representative of each detected occurrence of said identification signal, and a power source connected to said detecting means, and memory means.

Another aspect of this invention is directed to a method for surveying the readership of a designated magazine by individuals selected as test subjects, comprising the steps of attaching a transmitter to each copy of said designated magazine; emitting from said transmitter an identification signal unique to said designated magazine; providing a receiver capable of distinguishing said identification signal from other signals to generate a control signal in response thereto; and storing in response to said control signal a signal representative of each occurrence of said identification signal.

BRIEF DESCRIPTION OF THE DRAWING

The drawing depicts a schematic circuit block diagram of the invention.

DETAILED DESCRIPTION OF THE PREFERRED EMBODIMENT

To conduct the survey, persons are selected by the surveying organization based on certain criteria. These criteria can be, for example, age, income, geographic location, sex, and level of education. The publisher and/or advertisers of the magazine may require an analysis of their readership which is broken down into one or more of these categories. The individuals who are approached to be test subjects are merely asked to participate in a test the details of which are not explained. Each person is told only that a requirement of the test is the wearing of a certain article of clothing. Additional information is preferably not supplied in order to avoid predisposing or prejudicing the individual test subject toward or away from the aims of the survey. For example, if the individual were to be told that the survey relates to magazines, then this might result in more attention being paid to perusing magazines than would be normal for that person. Even worse would be the situation were the individual told the particular magazine involved in the survey. In order to avoid this problem, each individual is given an article of clothing to wear on a regular basis. For example, such an article of clothing might be a watch for men or a bracelet for women.

As depicted in the drawing, a receiver unit 10 and a transmitter unit 20 cooperate to provide information relating to the readership of a designated magazine by individuals who are selected to be test subjects.

The transmitter unit 10 is preferably constructed in the form of a flat, ultra-thin, card-sized insert for the magazine. Various types of inserts are commonly placed in magazine copies to advertise such products as perfume or to provide a convenient mailing postcard for a particular purpose. Such a card is typically stapled into or adhesively secured to a page inside the magazine copy. In this manner, the transmitter unit is camouflaged so that it provides no indication to the reader of its true purpose. In fact, to enhance its camouflage it might be printed with some type of advertisement or provided with a perfume-saturated flap. Internally, the "card" includes a battery 15 which powers transmitter 17. Battery 15 must, of course, be of the flat type with dimensions which, for example, are those of a battery currently available as part of a Polaroid film pack. Transmitter 17 can emit an analog or a digital magazine identification signal via antenna 19. This signal is unique to that particular magazine. Thus, Time magazine is assigned a signal and Newsweek is assigned a different one. A transmitter 17 can be a microchip which is sized small enough and flat enough to be accommodated in the "card". In the preferred embodiment, transmitter 17 is digital and generates a particular digital code. Such transmitters are conventional and well known. Clothing tags in department stores currently contain such transmitter chips as part of an anti-theft system. As such, no further details of its circuitry and configuration is deemed necessary. Antenna 19 is a miniature wire which, however, is sufficiently effective to emit the desired signal for the necessary distance, as discussed below.

A receiver unit 20 is accommodated in the above-mentioned article of clothing such as a watch or bracelet. It serves some useful or decorative function for its wearer so that the particular individual is unaware of its significance as far as the conduct of a survey is concerned. A watch is ideal for this purpose because a timing circuit is required anyway for the desired operation of the circuitry, as explained below.

Receiver unit 20 includes a receiving antenna 21 connected to a receiver 23. Receiver 23 is a circuit which serves to distinguish the signal emitted by transmitter 17 from other signals which may be picked up by antenna 21. If transmitter 17 is analog in nature, then receiver 23 would be a filter responsive to a very narrow range of frequencies. However, in the preferred digital embodiment, receiver 23 is a logic circuit which responds only to the particular digital code emitted by transmitter 17. Such circuitry is conventional and well known. As such, no specific circuit details are deemed necessary.

When receiver 23 detects a signal corresponding to that emitted by transmitter 17, it sends a control signal to timer 25. Timer 25 is, in turn, connected to memory 27. When receiver 23 initially detects the signal from transmitter 17 which identifies a particular magazine, its control signal causes timer 25 to store in an address location of memory 27 the exact time when the identification signal was first detected. When the identification signal is no longer picked up by receiver 23, timer 25 is controlled to store in the next address location of memory 27 the exact time when that signal loss occurred. Thus, by subtracting the first time stored in the memory from the second time stored in the memory, a "reading period" is obtained. Each such reading period is representative not only of the exposure of the magazine to the reader but also of a "reading occurrence". An analysis can then be made of how many times the individual test subject picked up the magazine and, also, the length of time the magazine was read for each occurrence.

In an alternative embodiment, receiver 23 is connected directly to memory 27 via line 29 shown in broken lines. The control signal over line 29 from receiver 23 would be effective to store an occurrence signal in specially assigned address locations of memory 27. Thus, memory 27 would have one set of addresses dedicated to "occurrences" and another set of address locations dedicated to "reading periods".

The information content of a memory 27 is retrieved from it by terminal 31. It should be understood that terminal 31 is normally not coupled to memory 27 which is housed in the above-mentioned article of clothing. Terminal 31 is a remote unit which is coupled to the article of clothing by suitable plugs after it has been retrieved by the surveying organization from the individual test subject. A suitable plug is inserted into the watch, say, and the stored information is caused to be transferred from memory 27 to terminal 31. Terminal 31 can be another form of memory, a hard copy unit such as a printer, and/or a video display device.

A key feature of this invention is the requirement that the magazine identification signal emitted by transmitter 17 be detected by receiver 23 only when the magazine is within approximately one foot of the article of clothing containing receiver unit 20. This is accomplished by adjusting the relationship between the transmitter power and the receiver sensitivity. The transmitter power can, for example, be reduced so as to be effective with a conventional receiver only up to the mentioned distance. On the other hand, the sensitivity of receiver 23 can likewise be adjusted so that it is low enough in comparison with what is available with a particular transmitter to detect signals only within the above-mentioned distance. This aspect of circuit design is conventional and well known. Accordingly, no specific details of the circuitry are deemed necessary.

Various devices are currently available which are capable of performing the tasks assigned to receiver unit 20. For example, Seiko markets a microprocessor-driven timepiece which it calls the Datagraph 2001. It includes a 2 K RAM memory capable of storing scheduling information. This memory could readily be adapted to receive the "occurrence" and/or "reading period" information for exposure of the magazine to an individual test subject. In addition, this Seiko product comes with the Datagraph 2301 interface module capable of transmitting data between the Datagraph 2001 and a computer terminal. Seiko also markets a system including the UC 2000 wrist terminal with 2K bytes of memory, a chronograph, a four line display, and a partitioned memory; a UC 2100 keyboard which can be coupled to the wrist terminal; and a UC 2200 controller with additional 4 K byte of memory, a built-in thermal printer, a RAM with a monthly scheduler, and means to transmit between the various units of the system. Such a unit can readily be modified for this invention by attaching to it an antenna 21 of a suitable size and type and a microchip which functions as receiver 23.

Although a particular embodiment has been described in detail above, it should be understood that various modifications to it can readily be made. For example, timer 25 can be dispensed with if for a particular type of survey the period of time during which the individual test subject is exposed to the magazine is not important. For such a survey, receiver 23 would be directly coupled to memory 27 so that the latter only stores the number of occurrences and not the time period involved with each occurrence. Also, although receiver 23 has been disclosed as responsive to only one identification signal from transmitter 17, it can also be responsive to several such identification signals. Each identification signal would, of course, be indicative of a particular magazine. With such a configuration, the receiver 23 would provide a unique control signal for each different type of identification signal it detects. Each control signal would store information unique to that particular magazine in a location of memory 27. Thus, information would be organized in memory 27 so that it could be retrieved and interpreted in categories separated according to each magazine of interest.

These and other such modifications are intended to be a part of the present invention as defined by the scope of the following claims.

I claim:

1. A system for surveying the readership of a designated magazine by individuals selected as test subjects, comprising:

a transmitter unit suitably sized for unobtrusive attachment to a copy of said designated magazine and including a power source, and a transmitter means connected to said power source for emitting an identification signal which is unique to said designated magazine; and a receiver unit adapted to be worn by each of said selected individuals and including detecting means for responding to said identification signal to generate a control signal, memory means for storing a signal representative of each detected occurrence of said control signal, and a power source connected to said detecting means and memory means.

2. The system of claim 1, wherein said transmitter unit is a thin, flat card adapted to be inserted in said magazine copy.

3. The system of claim 1, wherein said transmitter means includes an antenna.

4. The system of claim 1, wherein said transmitting means emits an identification signal powered so that it is detected only when the transmitter unit is within approximately one foot from said receiver unit.

5. The system of claim 1, wherein said detecting means includes an antenna.

6. The system of claim 5, wherein said detecting means includes a distinguishing means coupled to said antenna for responding only to said identification signal.

7. The system of claim 1, wherein said detecting means includes a distinguishing means for responding only to said identification signal.

8. The system of claim 1, wherein said receiver unit further comprises timing means coupled to said detecting means and said power source for providing in response to said control signal a duration signal corresponding to the length of time said identification signal is sensed by said detecting means, said memory means being coupled to said timing means for storing said duration signal.

9. The system of claim 8, wherein said detecting means senses said identification signal only when the receiver unit is within approximately one foot of the transmitter unit.

10. The system of claim 8, wherein said timing means provides the duration signal by generating a start signal indicative of when the identification is first detected and a stop signal indicative of when the identification signal is no longer detected.

11. The system of claim 1, further including retrieval means for reading information stored in said memory means.

12. The sytem of claim 1, wherein said detecting means senses said indentification signal only when the receiver unit is within approximately one foot of the transmitter unit.

13. The system of claim 1, further comprising timing means connected to said power source of providing, in response to said control signal, a duration signal corresponding to the period of time said identification signal is sensed by the detecting means.

14. The system of claim 13, wherein said memory means stores each detected occurrence of the identification signal along with its corresponding duration signal.

15. A method for surveying the readership of a designated magazine by individuals selected as test subjects, comprising the steps of:

attaching a transmitter to each copy of said designated magazine;

emitting from said transmitter an identification signal unique to said designated magazine;

providing a receiver capable of distinguishing said identification signal from other signals to generate a control signal in response thereto; and storing in response to said control signal a signal representative of each occurrence of said control signal.

16. The method of claim 15 wherein the storing step comprises storing in response to said control signal the duration of each occurrence of said identification signal.

17. The method of claim 15, wherein the receiver detects the identification signal emitted by the transmitter only when the receiver is within approximately one foot from the transmitter.

18. The method of claim 15 wherein the storing steps comprises the steps of storing each occurrence of the control signal and storing the time duration of each such occurrence.

* * * * *